US012513736B2

(12) United States Patent
Ramamurthi et al.

(10) Patent No.: US 12,513,736 B2
(45) Date of Patent: Dec. 30, 2025

(54) SYSTEMS AND METHODS FOR XR-AWARE RADIO SCHEDULING

(71) Applicant: Verizon Patent and Licensing Inc., Basking Ridge, NJ (US)

(72) Inventors: Vishwanath Ramamurthi, San Ramon, CA (US); Arda Aksu, Lafayette, CA (US); Wei David Huang, Danville, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 497 days.

(21) Appl. No.: 17/931,949

(22) Filed: Sep. 14, 2022

(65) Prior Publication Data

US 2024/0090017 A1 Mar. 14, 2024

(51) Int. Cl.
*H04W 72/56* (2023.01)
*H04W 72/566* (2023.01)

(52) U.S. Cl.
CPC ................................. *H04W 72/569* (2023.01)

(58) Field of Classification Search
None
See application file for complete search history.

(56) References Cited

U.S. PATENT DOCUMENTS

| | | | | |
|---|---|---|---|---|
| 2021/0027415 | A1* | 1/2021 | Khalid | G06N 20/00 |
| 2021/0367904 | A1* | 11/2021 | Park | H04L 43/04 |
| 2022/0028172 | A1* | 1/2022 | Yip | H04L 65/762 |
| 2022/0222583 | A1 | 7/2022 | Wouhaybi | |
| 2022/0232605 | A1* | 7/2022 | Kim | H04W 76/28 |
| 2022/0346077 | A1* | 10/2022 | Zhu | H04B 7/088 |
| 2023/0199198 | A1* | 6/2023 | Stoica | H04N 19/189 375/240.02 |
| 2023/0318982 | A1* | 10/2023 | Mondet | H04W 12/03 370/230 |
| 2023/0345298 | A1* | 10/2023 | Lee | H04L 47/564 |
| 2024/0049047 | A1* | 2/2024 | Yu | H04W 28/0278 |
| 2024/0259879 | A1* | 8/2024 | Ranganath | H04L 41/5054 |
| 2024/0305533 | A1* | 9/2024 | Bai | H04W 24/02 |
| 2025/0056522 | A1* | 2/2025 | Zhang | H04L 5/00 |

FOREIGN PATENT DOCUMENTS

| | | | | | |
|---|---|---|---|---|---|
| WO | WO-2023279865 | A1 | * | 1/2023 | H04L 1/00 |
| WO | WO-2023016294 | A1 | * | 2/2023 | H04L 1/1851 |
| WO | WO-2023017621 | A1 | * | 2/2023 | H04W 72/04 |
| WO | WO-2023154429 | A1 | * | 8/2023 | H04W 52/0219 |

* cited by examiner

*Primary Examiner* — Kodzovi Acolatse

(57) ABSTRACT

Systems and methods described herein provide extended reality (XR)-aware scheduling in a radio access network (RAN). A RAN device receives downlink (DL) metadata for downlink packets in an extended reality (XR) session and uplink (UL) metadata for uplink packets in the XR session. The RAN device selects a scheduling discipline for the XR session, based on the DL metadata and the UL metadata, and implements the selected scheduling discipline for the XR session.

20 Claims, 8 Drawing Sheets

400

| Time Stamp | Packet ID | Packet Size (Bytes) | Packet Type | GOP ID | UL/DL | Packet Importance |
|---|---|---|---|---|---|---|
| 1 | N | 2048 | Video: P Frame (Primary) | 1 | DL | 1 |
| 2 | N+1 | 128 | Video: I Frame ( ) | 1 | DL | 10 |
| ⋮ | | | | | | |
| X | | 256 | Video: I Frame ( ) | 1 | DL | 5 |
| X+1 | null | 0 | User Interaction | null | UL | 1 |
| ⋮ | | | | | | |
| X+Y | | 0 | Audio | null | DL | 3 |
| X+Y+1 | | 0 | Haptic Sensor | null | UL | 3 |

SYSTEMS AND METHODS FOR XR-AWARE RADIO SCHEDULING

BACKGROUND

XR (eXtended Reality) refers to wide set of use cases which can be broadly classified into Augmented Reality (AR), Virtual Reality (VR), and Mixed Reality (MR). These use cases represent different levels of mixtures of virtual/digital content and real-world experience. Each type of XR services has its own specific traffic characteristics in downlink and uplink communications.

New cellular networks (e.g., Fifth Generation (5G) networks) can provide various services and applications to user devices with optimized latency and quality of service. For example, the use of Multi-access Edge Computing (MEC) platforms with 5G networks allows high network computing loads to be transferred onto edge servers, which can minimize latency and reduce backhaul delay. XR services impose requirements on devices as well as the networks supporting such services.

BRIEF DESCRIPTION OF THE DRAWINGS

FIG. 4 is a diagram of a table that may be used for XR metadata, according to an implementation described herein.

DETAILED DESCRIPTION OF EXAMPLE EMBODIMENTS

Figure 1:
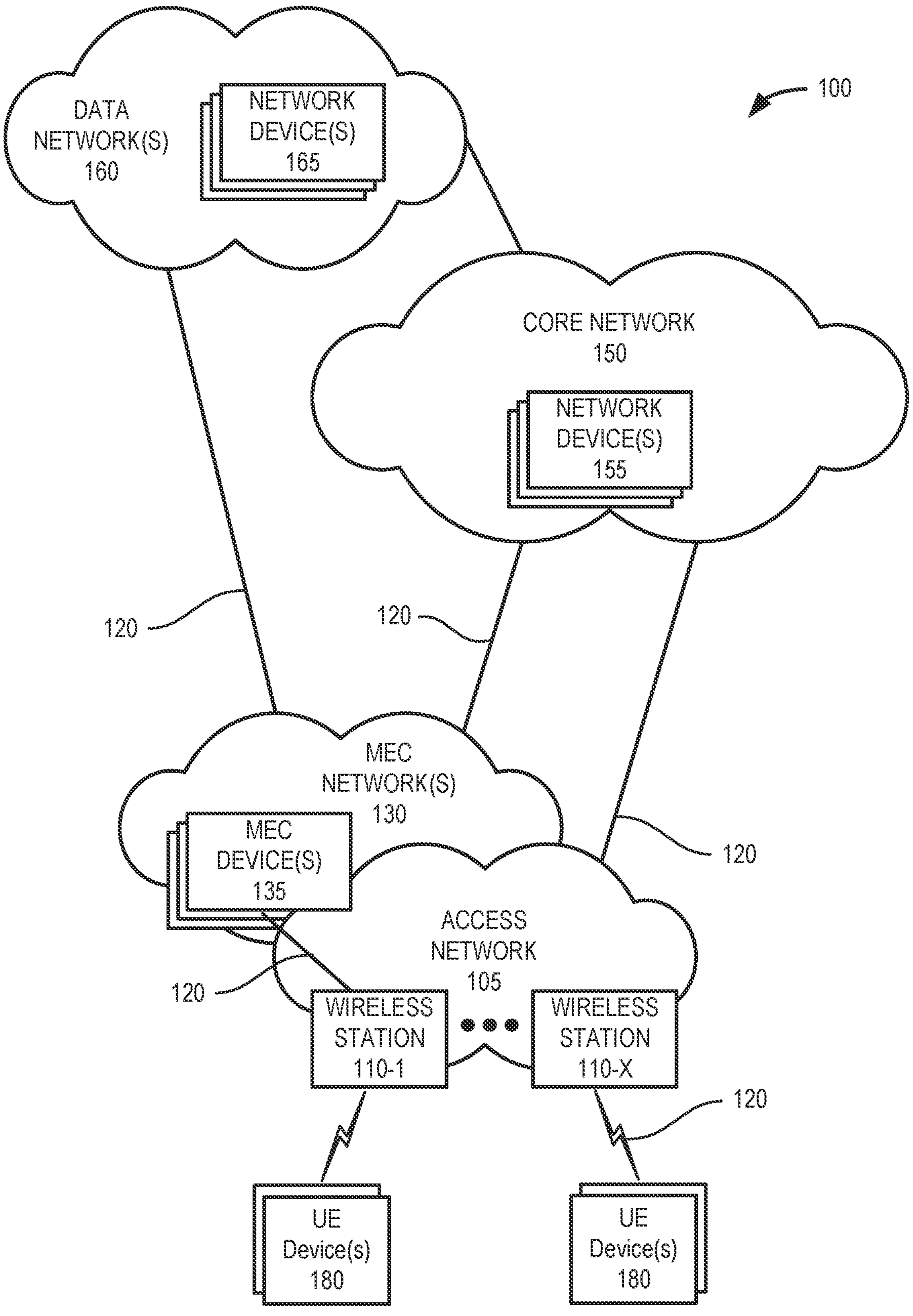
FIG. 1 is a diagram illustrating an exemplary environment in which embodiments may be implemented.

The following detailed description refers to the accompanying drawings. The same reference numbers in different drawings may identify the same or similar elements. Also, the following detailed description does not limit the invention.

XR devices typically include wearable technology to enable a user experience. For example, common XR devices today include head mounted displays together with haptic jackets/gloves. Requirements for such XR devices include low cost, low weight, low power consumption, and high-quality visualizations. Devices that meet these requirements typically cannot also manage the high compute loads associated with XR services Performing much of the required XR computing at a network edge reduces the compute/storage/power requirements for the XR device, but increases the downlink (DL) and uplink (UL) requirements (e.g., throughput, latency, reliability, etc.) for the service provider network. Different XR services, such as Augmented Reality (AR) services, Virtual Reality (VR) services, and Mixed Reality (MR) services, may have their own specific traffic characteristics for DL and UL signals. To meet or exceed quality of experience (QoE) requirements for XR services, a network needs to quickly adapt over-the-air scheduling for the varied traffic characteristics of different XR communications.

Scheduling may generally be referred to as allocating resources for transmitting data, such as transmissions over a radio interface between a base station and an end device. In the context of XR services described herein, resource allocation may be dynamically adjusted between semi-persistent scheduling (SPS) and dynamic scheduling.

SPS is typically used for services like voice (e.g., voice-over-IP), which have periodic traffic (e.g., fixed size packets arriving at regular periodic intervals) in both UL and DL. With SPS-based resource allocation, a serving base station allocates at least a part of resources and transport formats to the end device semi-statically over a certain time interval. Using SPS for periodic traffic ensures regular availability of network resources for a service (e.g., XR service), thus ensuring a good user experience. Also, underutilized network resources with SPS are minimal. Furthermore, there is little to no overhead associated for requesting grants that are typically needed for aperiodic traffic.

Dynamic scheduling uses control information to adjust the amount of UL/DL data that can be transferred over a radio interface. Dynamic scheduling is more suited for web browsing service because the traffic characteristics are not periodic and do not typically follow a specific pattern. Using SPS for such traffic would result in highly inefficient use of limited radio resources.

For XR services, most DL traffic is expected to be more like video traffic, with the specific traffic characteristic depending on the content, transcoding rate, and variations per user interaction. The DL packets that are transmitted via a radio access network (e.g., from an application server, for example) typically come with periodicity of video frame rate. However, this periodicity can vary slightly depending on user interactions. The XR packet sizes depend on a variety of factors including the digital content, the interaction between digital and real-world content, transcoding rate, and underlying video rate adaptation techniques. The importance of each packet also varies per the content and the transcoding scheme used. Considering such factors, the DL traffic for XR services can be modeled as quasi-periodic.

UL traffic for XR services may have different characteristics. For VR use cases, UL traffic is expected to follow a model (e.g., a pose and control model), which can be treated as low rate periodic traffic. For AR and MR use cases, UL traffic also involves video content capturing the real world, which is quasi-periodic similar to the XR DL traffic.

Systems and methods described herein provide an XR-aware intelligence function to optimize exchange of XR traffic over a RAN. Metadata of the digital content for XR services may be shared with a RAN (e.g., a serving gNB). As described further herein, the metadata may include relative time stamps of video content, frame type, and packet type, etc. The XR-aware intelligence function may select a scheduling discipline (e.g., dynamic scheduling, SPS, etc.) for the gNB based on the XR metadata. According to an implementation, the XR-aware intelligence function in the gNB may further adjust scheduling parameters for the selected scheduling discipline based on the XR metadata.

FIG. 1 illustrates an exemplary environment 100 that includes an access network 105, one or more MEC networks 130, a core network 150, and one or more data networks 160. Access network 105 may include wireless stations 110-1 through 110-X (referred to collectively as wireless stations 110 and generally as wireless station 110). MEC network 130 may include MEC devices 135; core network 150 may include network devices 155; and data networks 160 may include network devices 165. Environment 100 further includes multiple user equipment (UE) devices 180 (referred to herein collectively as UEs 180 and individually as UE 180).

The number, the type, and the arrangement of network devices and the number of UEs 180 illustrated in FIG. 1 are exemplary. A network device, a network element, or a network function (referred to herein simply as a network device) may be implemented according to one or multiple network architectures, such as a client device, a server device, a peer device, a proxy device, a cloud device, a virtualized function, and/or another type of network architecture (e.g., Software Defined Networking (SDN), virtual, logical, network slicing, etc.). Additionally, a network device may be implemented according to various computing architectures, such as centralized, distributed, cloud (e.g., elastic, public, private, etc.), edge, and/or another type of computing architecture.

Environment 100 includes communication links 120 between the networks, between the network devices, and between UEs 180 and the network devices. Environment 100 may be implemented to include wired, optical, and/or wireless communication links among the network devices and the networks illustrated. A connection via a communication link 120 may be direct or indirect. For example, an indirect connection may involve an intermediary device and/or an intermediary network not illustrated in FIG. 1. A direct connection may not involve an intermediary device and/or an intermediary network. The number and the arrangement of communication links 120 illustrated in environment 100 are exemplary.

Access network 105 may include one or multiple networks of one or multiple types and technologies. For example, access network 105 may include a 5G radio access network (RAN), a Fourth Generation (4G) RAN, and/or another type of future generation RAN. By way of further example, access network 105 may be implemented to include a 5G New Radio (5G NR) RAN, an Evolved UMTS Terrestrial Radio Access Network (E-UTRAN) of a Long Term Evolution (LTE) network, an LTE-Advanced (LTE-A) network, and/or an LTE-A Pro network, and/or another type of RAN (e.g., a legacy RAN). Access network 105 may further include other types of wireless networks, such as a WiFi network, a Worldwide Interoperability for Microwave Access (WiMAX) network, a local area network (LAN), or another type of network that may provide an on-ramp to wireless stations 110 and/or core network 150.

Depending on the implementation, access network 105 may include one or multiple types of wireless stations 110. For example, wireless station 110 may include a next generation Node B (gNB) for a 5G NR RAN, an evolved Node B (eNB), an evolved Long Term Evolution (eLTE) eNB, a radio network controller (RNC), a remote radio head (RRH), a baseband unit (BBU), a small cell node (e.g., a picocell device, a femtocell device, a microcell device, a home eNB, a repeater, etc.), or another type of wireless node. According to various embodiments, access network 105 may be implemented according to various wireless technologies (e.g., radio access technology (RAT), etc.), wireless standards, wireless frequencies/bands, and so forth. According to an implementation, wireless stations 110 may include both eNBs and gNBs.

In some implementations, access network 105 may support separate control plane and user plane signaling. For example, a wireless station 110 implemented as a gNB may include multiple decomposed distributed components, such as a central unit (CU) with separate control plane and user plane functionality, a distributed unit (DU), a remote unit (RU) or a remote radio unit (RRU)), or another type of distributed arrangement. In other implementations, access network 105 may include open network devices (e.g., Open RAN (O-RAN) Centralized Unit (O-CU), O-RAN Distributed Unit (O-DU), O-RAN next generation Node B (O-gNB), O-RAN evolved Node B (O-eNB, etc.), a future generation wireless access device, or another type of wireless node (e.g., a WiMax device, a hotspot device, etc.) that provides a wireless access service.

MEC network 130 (also referred to as an "application service layer network" or "edge network") may include a platform that provides application services, such as low latency services, at the edge of a network. For purposes of illustration and description, MEC devices 135 may include various types of network devices that may be resident in MEC network 130. MEC devices 135 may include variable compute configurations, including, without limitation, a central processing unit (CPU), a graphical processing unit (GPU), a field programmable gate array (FPGA), etc. MEC devices 135 may also include devices to perform orchestration and containerization functions. MEC devices 135 may be located to provide geographic proximity to various groups of wireless stations 110. In some embodiments, MEC devices 135 may be co-located with a wireless station 110 or with a component of a wireless station (e.g., a control unit of a gNB). In other embodiments, wireless stations 110 may connect to MEC network 130 via wired (e.g., optical) backhaul links 120. In other embodiments, MEC devices 135 may be co-located with elements of access network 105 and/or core network 150. As used herein, the term "co-located" may refer to elements that are located within the same platform or subsystem of environment 100.

MEC network 130 may be implemented using one or multiple technologies including, for example, network function virtualization (NFV), software defined networking (SDN), cloud computing, webscale, or another type of network technology. Depending on the implementation, MEC network 130 may include, for example, virtualized network functions (VNFs), containerized network functions (CNFs), multi-access (MA) applications/services, and/or servers. MEC network 130 may also include other network devices that support its operation, such as, for example, a network function virtualization orchestrator (NFVO), a virtualized infrastructure manager (VIM), an operations support system (OSS), a local domain name server (DNS), a virtual network function manager (VNFM), and/or other types of network devices and/or network resources (e.g., storage devices, communication links, etc.).

Core network 150 may include one or multiple networks of one or multiple network types and technologies. For example, core network 150 may be implemented to include an Evolved Packet Core (EPC) of an LTE network, an LTE-A network, an LTE-A Pro network, a Next Generation Core (NGC), a 5G Core Network (5GC) for a 5G network and/or a legacy core network. According to one implementation, core network 150 may include a non-standalone (NSA) core network to support dual coverage using 4G and 5G networks, referred to as interoperability Option 3x, or other 3GPP defined NSA-based architecture options. Core network 150 may manage communication sessions for UEs 180. For example, core network 150 may establish an Internet Protocol (IP) connection between a UE 180 and a MEC device 135 in a particular MEC network 130 location. Furthermore, core network 150 may enable UE 180 to communicate with an application server or another type of network device 165 located in a particular data network 160.

Depending on the implementation, core network 150 may include various network elements that may be implemented in network devices 155. Such network elements may include a user plane function (UPF), a session management function (SMF), a core access and mobility management function (AMF), a unified data management (UDM), a packet data network (PDN) gateway (PGW), a mobility and management entity (MME), a serving gateway (SGW), a policy charging rules function (PCRF), a policy function (PCF), a policy control, a home subscriber server (HSS), as well other network elements pertaining to various network-related functions, such as billing, security, authentication and authorization, network polices, subscriber profiles, network slicing, and/or other network elements that facilitate the operation of core network 150. In the context of a core network that is configured to support 5G UE devices 180, core network 150 may include one or more network devices 155 with combined 4G and 5G functionality, such as a session management function with PDN gateway-control plane (SMF+PGW-C) and a user plane function with PDN gateway-user plane (UPF+PGW-U).

Data network 160 may include one or multiple networks. For example, data network 160 may be implemented to include a service or an application-layer network, the Internet, an Internet Protocol Multimedia Subsystem (IMS) network, a Rich Communication Service (RCS) network, a cloud network, a packet-switched network, or other type of network that hosts a user device application or service. Depending on the implementation, data network 160 may include various network devices 165 that provide various applications, services, or other type of user device assets (e.g., servers (e.g., web, application, cloud, etc.), mass storage devices, data center devices), and/or other types of network services pertaining to various network-related functions.

UE device 180 may include a device that has computational and wireless communication capabilities. UE device 180 may be implemented as a mobile device, a portable device, a stationary device, a device operated by a user, or a device not operated by a user. For example, UE device 180 may be implemented as an XR device for a VR system, AR system, or MR system; a game system; a smartphone; a Mobile Broadband device; a computer; a tablet; a wearable device (e.g., glasses, wristwatch, etc.); a vehicle support system; a drone; or some other type of wireless device. According to various exemplary embodiments, UE device 180 may include or be connected to a video camera or other video/audio equipment. UE device 180 may also be configured to execute various types of software (e.g., applications, programs, graphics processing, etc.). UE device 180 may support one or multiple RATs (e.g., 4G, 5G, etc.), one or multiple frequency bands, network slicing, dual-connectivity, and so forth. Additionally, UE device 180 may include one or multiple communication interfaces that provide one or multiple (e.g., simultaneous or non-simultaneous) connections via the same or different RATs, frequency bands, etc. According to an implementation, UE device 180 may be configured with or download a client application. The client application may be an XR-based application designed to use MEC resources.

As described further herein, UE device 180 or applications running on UE device 180 may be configured for certain types of communications in network environment 100. For example, UE device 180 may be associated with an identifier such as a network slice selection assistance information (NSSAI) that governs certain types of network traffic, such as XR traffic designated for MEC-based services. According to an implementation, developers may incorporate application programming interface (APIs) in their applications to provide XR metadata when operated with MEC network 130.

Figure 2A:
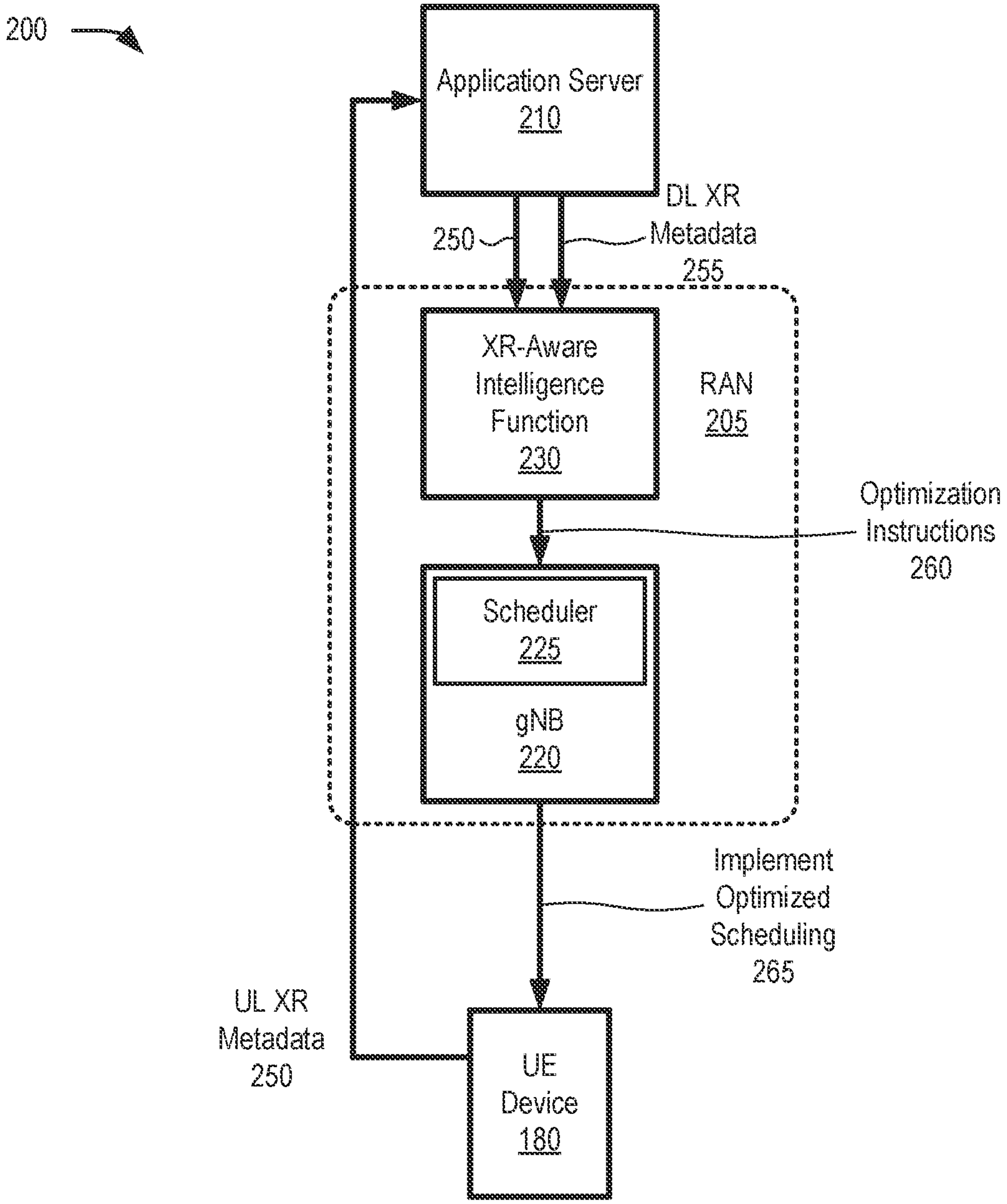
FIGS. 2A-2C are diagrams illustrating examples of configurations and communications to implement XR-Aware scheduling.
Figure 2B:
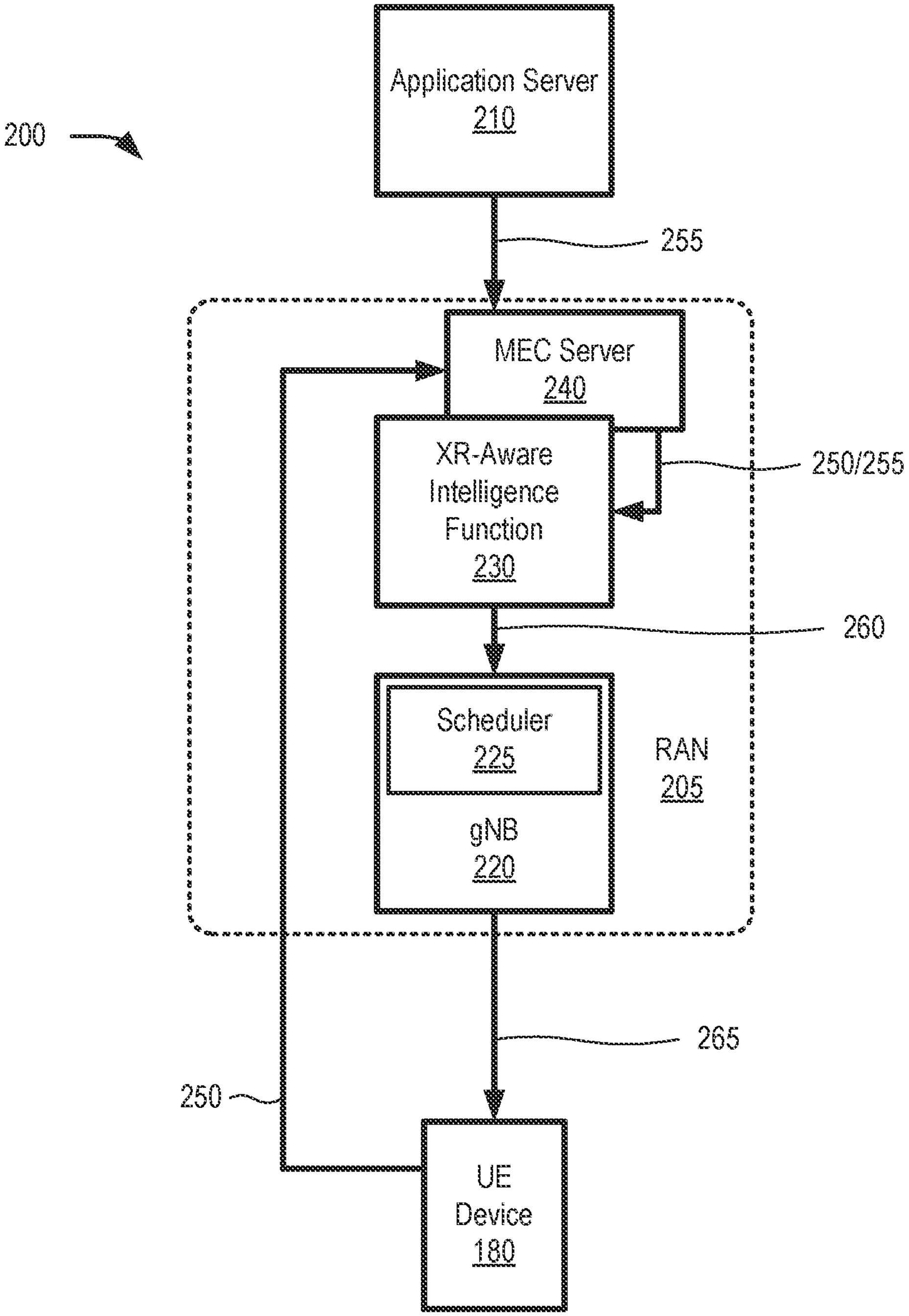
Figure 2C:
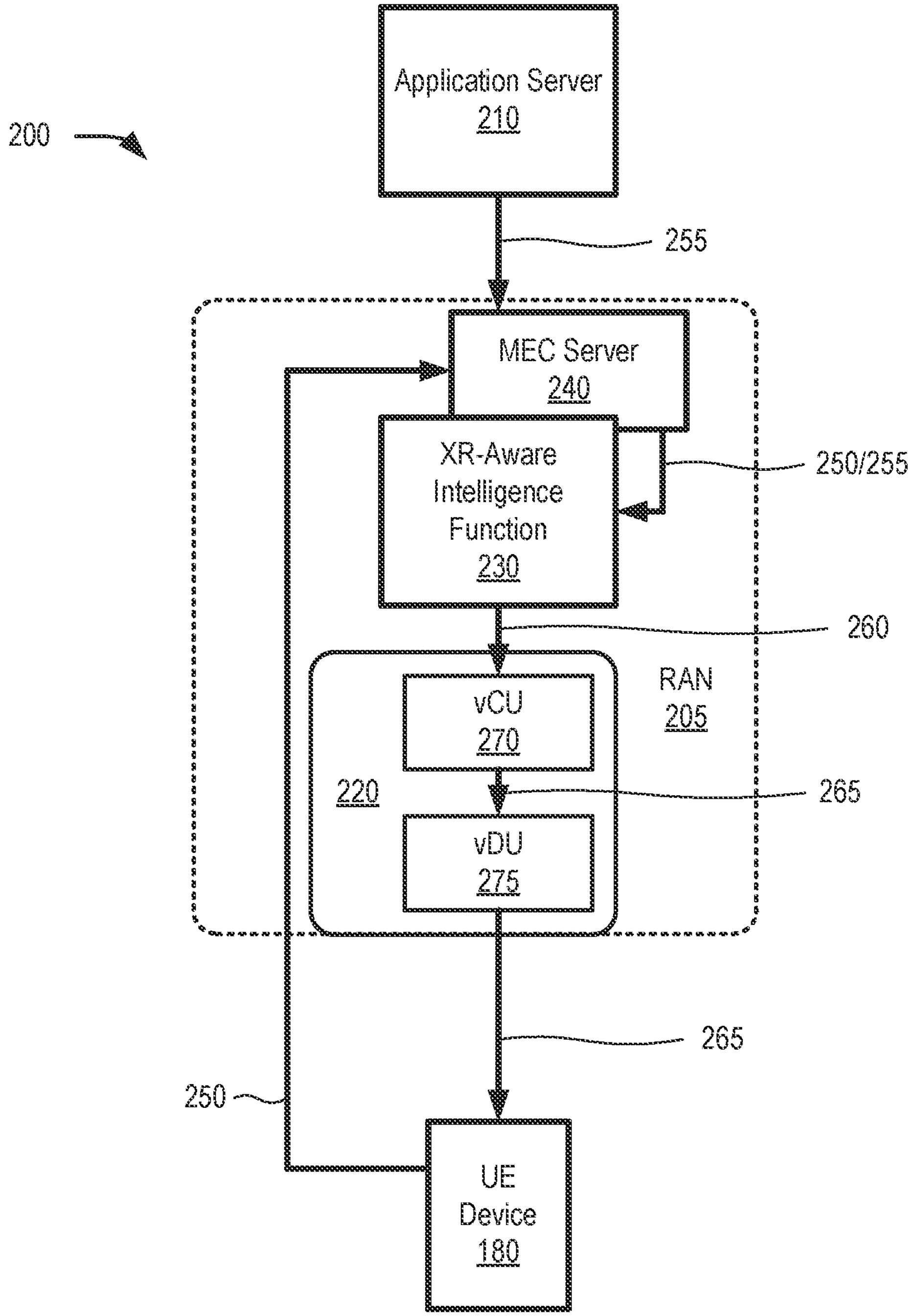

FIGS. 2A-2C illustrate examples of configurations and communications to implement XR-Aware scheduling in a portion 200 of network environment 100, according to different implementations. Referring to FIG. 2A, environment 200 may include UE device 180, a RAN 205, an application server 210, a gNodeB 220, and an XR-aware intelligence function 230.

UE device 180 may execute an XR client application that provides an XR experience to a user. UE device 180 may be configured to provide UL metadata to application server 210. As described in more detail further herein, the UL metadata may identify a time stamp of video content, frame type, packet type and other features that may be used to identity a type of XR traffic.

RAN 205 may correspond to access network 105 described above. RAN 205 may include gNB 220 and XR-aware intelligence function 230. In some implementations, MEC server 240 (e.g., a MEC device 135) may be co-located in RAN 205.

Application server 210 may include one or more network devices that host particular XR applications (apps) that perform various functions and/or provide various different network services. According to an implementation, application server 210 may correspond to one of network devices 165. In another implementation, application server 210 may correspond to a network device 155. Application server 210 may be configured to receive UL XR metadata from UE device 180. For example, application server 210 may be configured to receive UL XR metadata from UE device 180 via an API designed for control plane transfer of XR metadata. Application server 210 may be further configured to share metadata of DL digital content related to an XR application session, along with the received UL XR metadata, to XR-aware intelligence function 230. For example, application server 210 may be configured to send DL XR metadata and UL XR metadata to gNB 220 via an API designed for control plane transfer of XR metadata.

Each gNB 220 may correspond to a wireless station 110. According to an implementation described herein, gNB 220 may include a scheduler 225 that may implement instructions from XR-aware intelligence function 230 to schedule use of resources (e.g., resource blocks in a physical layer) to optimize delivery of UL XR traffic from UE devices 180 and DL XR traffic from gNB 220. Scheduler 225 may schedule use of resources for multiple devices and/or sessions in a geographical area (e.g., a cell or sector) serviced by gNB 220.

XR-aware intelligence function 230 may be included with or in communication with gNB 220. XR-aware intelligence function 230 may be configured to receive and process DL XR metadata and UL XR metadata from application server 210. For example, the DL XR metadata and UL XR metadata may be provided via an API designed for control plane transfer of XR metadata. According to an implementation, XR-aware intelligence function 230 may be implemented within a O-RAN architecture. XR-aware intelligence function 230 may be capable of understanding the XR metadata and make intelligent RAN optimizations based on such data. For example, XR-aware intelligence function 230 may adjust a gNB scheduling discipline (e.g., to be implemented by scheduler 225) based on the XR metadata. XR-aware intelligence function 230 is described further below in connection with FIGS. 5 and 6.

As further shown in FIG. 2A, during an XR session, UE device 180 may provide UL XR metadata 250 to application server 210 (e.g., using a dedicated API). Application server 210 may also generate/collect DL XR metadata 255 for the session. Application server 210 may forward UL XR metadata 250 and DL XR metadata 255 to XR-aware intelligence function 230. XR-aware intelligence function 230 may analyze UL XR metadata 250 and DL XR metadata 255, select an optimal scheduling discipline (e.g., dynamic scheduling, SPS, etc.), and define scheduling parameters based on the metadata from the XR session. According to an implementation, UL XR metadata 250 and DL XR metadata 255 may be provided and analyzed in real-time or near-real-time (e.g., less than about 1 second). XR-aware intelligence function 230 may provide the selected scheduling discipline and parameters to gNB 220/scheduler 225 as optimization instructions 260. gNB 220/scheduler 225 may apply optimization instructions 260 to implement 265 the optimized scheduling for the XR session (between UE device 180 and MEC network 130).

Referring to FIG. 2B, in another implementation, environment 200 includes UE device 180, application server 210, gNodeB 220, XR-aware intelligence function 230, and a MEC server 240. MEC server 240 may correspond, for example, to one of MEC devices 135. MEC server 240 may include, for example, an instance of an application function to support XR services for UE device 180. MEC server 240 may be configured to receive UL and DL XR metadata (e.g., using dedicated APIs) and forward the XR metadata to XR-aware intelligence function 230.

In the configuration of FIG. 2B, UE device 180 may provide UL XR metadata 250 to MEC server 240. Application server 210 may forward DL XR metadata 255 for the session to MEC server 240. MEC server 240 may receive UL XR metadata 250 and DL XR metadata 255 and forward the same to XR-aware intelligence function 230. Similar to FIG. 2A, XR-aware intelligence function 230 may identify and provide scheduling discipline and parameters to gNB 220/scheduler 225 as optimization instructions 260. gNB 220/scheduler 225 may apply optimization instructions 260 to implement 265 the optimized scheduling for the XR session.

Referring to FIG. 2C, in another implementation, environment 200 includes UE device 180, application server 210, gNodeB 220, XR-aware intelligence function 230, and a MEC server 240. In the configuration of FIG. 2C, gNB 220 may be a distributed component including a virtualized CU (vCU) 270 and one or more virtualized DUs (vDU) 275. The vCU 270 controls the transport of data (e.g., data packets) received via wireless radio frequency (RF) transmissions from a UE device 180, and controls the transport of data from the wireless network to a vDU 275 for wireless transmission to a destination UE device 180.

Similar to FIG. 2B described above, UE device 180 may provide UL XR metadata 250 to MEC server 240, and application server 210 may forward DL XR metadata 255 for the session to MEC server 240. MEC server 240 may receive XR metadata 250/255 and forward the metadata to XR-aware intelligence function 230. XR-aware intelligence function 230 may identify and provide scheduling discipline and parameters to vCU 270 as optimization instructions 260. The vCU 270 may apply optimization instructions 260 to implement 265 the optimized scheduling for the XR session.

Although FIGS. 2A-2C show examples of components and communications in network portion 200, in other implementations, network portion 200 may include fewer components, different components, additional components, or differently arranged components than depicted in FIGS. 2A-2C.

Figure 3:
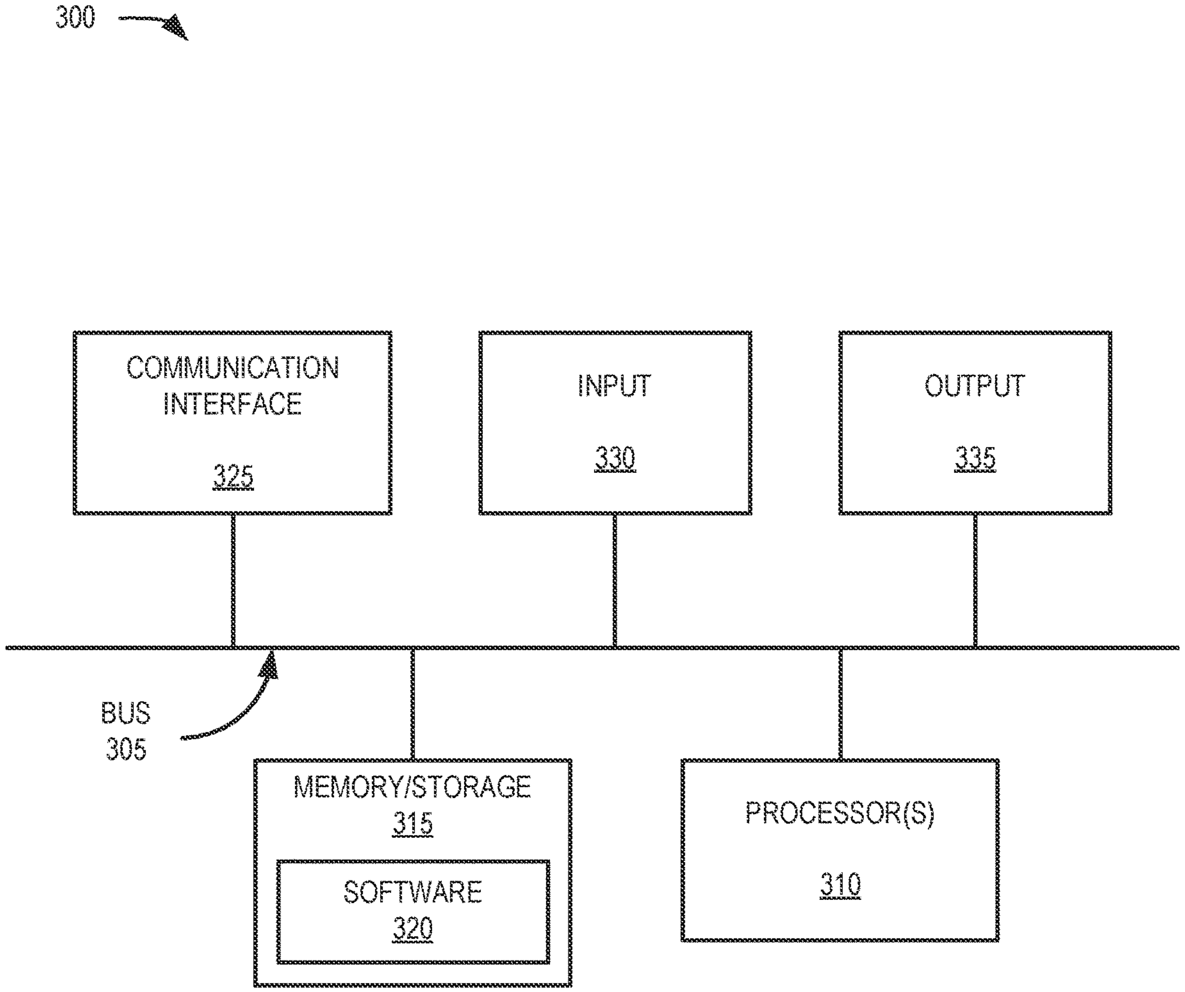
FIG. 3 is a diagram illustrating exemplary components of a device that may correspond to one or more of the devices illustrated and described herein.

FIG. 3 is a diagram illustrating exemplary components of a device 300 that may be included in one or more of the devices described herein. For example, device 300 may correspond to elements of wireless station 110 (e.g., CU 270, DU 275, etc.), MEC device 135, network device 155, network device 165, UE device 180, application server 210, gNB 220, scheduler 225, XR-aware intelligence function 230, MEC server 240, and/or other types of network devices, as described herein. As illustrated in FIG. 3, device 300 includes a bus 305, a processor 310, a memory/storage 315 that stores software 320, a communication interface 325, an input 330, and an output 335. According to other embodiments, device 300 may include fewer components, additional components, different components, and/or a different arrangement of components than those illustrated in FIG. 3 and described herein.

Bus 305 includes a path that permits communication among the components of device 300. For example, bus 305 may include a system bus, an address bus, a data bus, and/or a control bus. Bus 305 may also include bus drivers, bus arbiters, bus interfaces, clocks, and so forth.

Processor 310 includes one or multiple processors, microprocessors, data processors, co-processors, graphics processing units (GPUs), application specific integrated circuits (ASICs), controllers, programmable logic devices, chipsets, field-programmable gate arrays (FPGAs), application specific instruction-set processors (ASIPs), system-on-chips (SoCs), central processing units (CPUs) (e.g., one or multiple cores), microcontrollers, neural processing unit (NPUs), and/or some other type of component that interprets and/or executes instructions and/or data. Processor 310 may be implemented as hardware (e.g., a microprocessor, etc.), a combination of hardware and software (e.g., a SoC, an ASIC, etc.), may include one or multiple memories (e.g., cache, etc.), etc.

Processor 310 may control the overall operation or a portion of operation(s) performed by device 300. Processor 310 may perform one or multiple operations based on an operating system and/or various applications or computer programs (e.g., software 320). Processor 310 may access instructions from memory/storage 315, from other components of device 300, and/or from a source external to device 300 (e.g., a network, another device, etc.). Processor 310 may perform an operation and/or a process based on various techniques including, for example, multithreading, parallel processing, pipelining, interleaving, etc.

Memory/storage 315 includes one or multiple memories and/or one or multiple other types of storage mediums. For example, memory/storage 315 may include one or multiple types of memories, such as, a random access memory (RAM), a dynamic random access memory (DRAM), a static random access memory (SRAM), a cache, a read only memory (ROM), a programmable read only memory (PROM), an erasable PROM (EPROM), an electrically EPROM (EEPROM), a single in-line memory module (SIMM), a dual in-line memory module (DIMM), a flash memory (e.g., 2D, 3D, NOR, NAND, etc.), a solid state memory, and/or some other type of memory. Memory/storage 315 may include a hard disk (e.g., a magnetic disk, an optical disk, a magneto-optic disk, a solid state disk, etc.), a Micro-Electromechanical System (MEMS)-based storage medium, and/or a nanotechnology-based storage medium.

Memory/storage 315 may include drives for reading from and writing to the storage medium. Memory/storage 315 may store data, software, and/or instructions related to the operation of device 300.

Software 320 includes an application or a program that provides a function and/or a process. Software 320 may also include firmware, middleware, microcode, hardware description language (HDL), and/or other form of instruction. Software 320 may also be virtualized. Software 320 may further include an operating system (OS) (e.g., Windows, Linux, Android, proprietary, etc.).

Communication interface 325 permits device 300 to communicate with other devices, networks, systems, and/or the like. Communication interface 325 includes one or multiple wireless interfaces and/or wired interfaces. For example, communication interface 325 may include one or multiple transmitters and receivers, or transceivers (e.g., RF transceivers). Communication interface 325 may operate according to a protocol stack and a communication standard. Communication interface 325 may include an antenna. Communication interface 325 may include various processing logic or circuitry (e.g., multiplexing/de-multiplexing, filtering, amplifying, converting, error correction, API, etc.). Communication interface 325 may be implemented as a point-to-point interface, a service-based interface, or a reference interface, for example.

Input 330 permits an input into device 300. For example, input 330 may include a keyboard, a mouse, a display, a touchscreen, a touchless screen, a button, a switch, an input port, speech recognition logic, and/or some other type of visual, auditory, tactile, etc., input component. Output 335 permits an output from device 300. For example, output 335 may include a speaker, a display, a touchscreen, a touchless screen, a light, an output port, and/or some other type of visual, auditory, tactile, etc., output component.

As previously described, a network device may be implemented according to various computing architectures (e.g., in a cloud, edge, etc.) and according to various network architectures (e.g., a virtualized function, etc.). Device 300 may be implemented in the same manner. For example, device 300 may be instantiated, created, deleted, or some other operational state during its life-cycle (e.g., refreshed, paused, suspended, rebooting, or another type of state or status), using well-known virtualization technologies (e.g., hypervisor, container engine, virtual container, virtual machine, etc.) in an application service layer network (e.g., MEC network 130) and/or another type of network.

Device 300 may perform a process and/or a function, as described herein, in response to processor 310 executing software 320 stored by memory/storage 315. By way of example, instructions may be read into memory/storage 315 from another memory/storage 315 (not shown) or read from another device (not shown) via communication interface 325. The instructions stored by memory/storage 315 cause processor 310 to perform a process described herein. Alternatively, for example, according to other implementations, device 300 performs a process described herein based on the execution of hardware (processor 310, etc.).

FIG. 4 is a diagram of a table 400 that may be used for XR metadata. According to an implementation, table 400 may include data compiled from UL XR metadata 250 and DL XR metadata 255 (referred to collectively as XR metadata 250/255). For example, XR-aware intelligence function 230 may apply information from table 400 to perform XR-Aware scheduling.

Table 400 may include a time stamp field 410, a packet ID field 420, a packet size field 430, a packet type field 440, a group of pictures (GOP) ID field 450, a UL/DL field 460, and a packet importance field 470. As further illustrated, table 400 includes entries 490 that each includes a grouping of fields 410-470 that are correlated (e.g., a record, etc.). The XR packet metadata 250/255 is illustrated in tabular form merely for the sake of description. In this regard, packet metadata 250/255 may be implemented in a data structure different from a table (e.g., a list, a flat file, etc.), a database, or another type of structure. Additionally, values shown in fields 410-470 are illustrative. According to other embodiments, the values, strings, or instances of information stored in a field may be different.

Time stamp field 410 may store data that indicates a time, such as a date and time in hours:minutes:seconds:milliseconds format, when a data packet for an XR session was created. Packet ID field 420 may provide a unique identifier for the packet. Packet size field 430 may store a size (e.g., in bytes) of the packet. Packet type field 440 may store a type of the packet, such as I-Frame, P-Frame, audio, user interaction, haptic sensor, etc. GOP ID field 450 may include of indication of whether a packet is associated with group of fames (e.g., a group of sequential P-frames and/or I-Frames). UL/DL field 460 may indicate whether a packet was transmitted as UL or DL packet. Packet importance field 470 may provide an importance value, which may be a configured value based on values of one or more other fields in a particular packet entry 490. Packet importance field 470 may, for example, be a ranking value (e.g., an integer value) corresponding to a packet importance ranking on a scale from 1 (least important) to 10 (most important).

Figure 5:
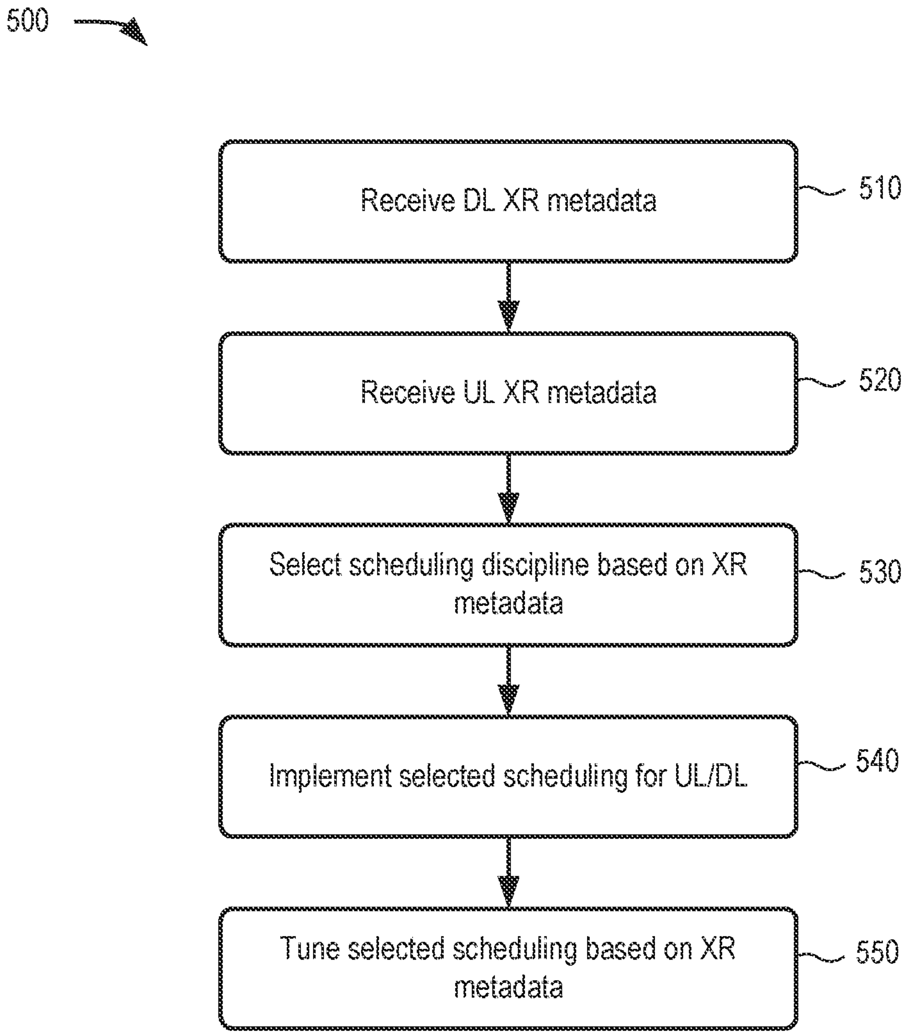
FIGS. 5 and 6 are flow diagrams illustrating exemplary processes for dynamically implementing a scheduling discipline for an XR session, according to an implementation.

FIG. 5 is a flow diagram illustrating a process 500 for dynamically implementing a scheduling discipline for an XR session. According to an implementation, process 500 may be performed, for example, by XR-aware intelligence function 230. According to an implementation, processor 310 executes software 320 to perform steps of process 500, as described herein. Alternatively, a step may be performed by execution of only hardware. In other implementations, process 500 may be performed by XR-aware intelligence function 230 in conjunction with one or more other devices or functions in environment 200.

Process 500 may include receiving DL XR metadata (block 510). For example, when a session is established between application server 210 and UE device 180, application server 210 may provide to XR-aware intelligence function 230 metadata for XR packets being sent to UE device 180 (e.g., DL XR metadata 255). In another example, application server 210 may provide DL XR metadata 255 to MEC server 240, which may forward the DL XR metadata to XR-aware intelligence function 230. The DL metadata 255 may include, for example, data corresponding to fields 410-470 of table 400. According to an implementation, XR-aware intelligence function 230 may receive the DL XR metadata 255 from application server 210 via an API configured for transmitting such data.

Process 500 may also include receiving UL XR metadata (block 520). For example, when a session is established between application server 210 and UE device 180, UE device 180 may provide to application server 210 metadata for XR packets being sent from UE device 180 (e.g., UL XR metadata 250). In another example, when a session is established between MEC server 240 and UE device 180, UE device 180 may provide to MEC server 240 metadata for XR packets being sent from UE device 180. The UL metadata 250 may include, for example, data corresponding to fields 410-470 of table 400. According to an implementation, application server 210 may forward the UL XR metadata 250 to XR-aware intelligence function 230. According to another implementation, MEC server 240 may forward the UL XR metadata 250 to XR-aware intelligence function 230. According to an implementation, XR-aware intelligence function 230 may receive the UL XR metadata 250 from application server 210 or MEC server 240 via an API configured for transmitting such data. In some implementations, UL XR metadata 250 and DL XR metadata 255 may be received by XR-aware intelligence function 230 in a combined data stream.

Process 500 may further include selecting a scheduling discipline based on the XR metadata (block 530). For example, XR-aware intelligence function 230 may make intelligent RAN optimizations based on the received UL XR metadata 250 and DL XR metadata 255. According to an implementation, scheduler 225 may initially default to dynamic scheduling for an XR session while initial XR metadata 250/255 is collected. XR-aware intelligence function 230 may analyze particular fields (e.g., from table 400) of XR metadata 250/255 for selecting a scheduling discipline. For example, data from time stamp field 410 and packet size field 430 may be data used by scheduler 225 for determining a level of periodicity used in selecting a between dynamic scheduling and SPS. XR-aware intelligence function 230 may further analyze additional fields of XR metadata 250/255 to determine initial parameters for the selected scheduling discipline.

Process 500 may further include implementing the selected scheduling for UL and DL XR traffic (block 540). For example, XR-aware intelligence function 230 may provide scheduling instructions for the XR session (e.g., between UE device 180 and application server 210) to scheduler 225. Scheduler 225 may implement the instructions from XR-aware intelligence function 230 to schedule use of resources for UL XR traffic from UE device 180 and for DL XR traffic to UE device 180. For example, scheduler 225 may integrate scheduling for the XR session with scheduling for other sessions/devices to minimize latency and/or meet QoE requirements.

Process 500 may additionally include tuning the selected scheduling discipline based on the XR metadata (block 550). For example, XR-aware intelligence function 230 may continue to receive additional XR metadata 250/255 throughout the XR session. XR-aware intelligence function 230 may analyze the additional data and adjust parameters for the selected scheduling discipline (e.g., dynamic scheduling or SPS) based on the additional XR metadata 250/255.

Figure 6:
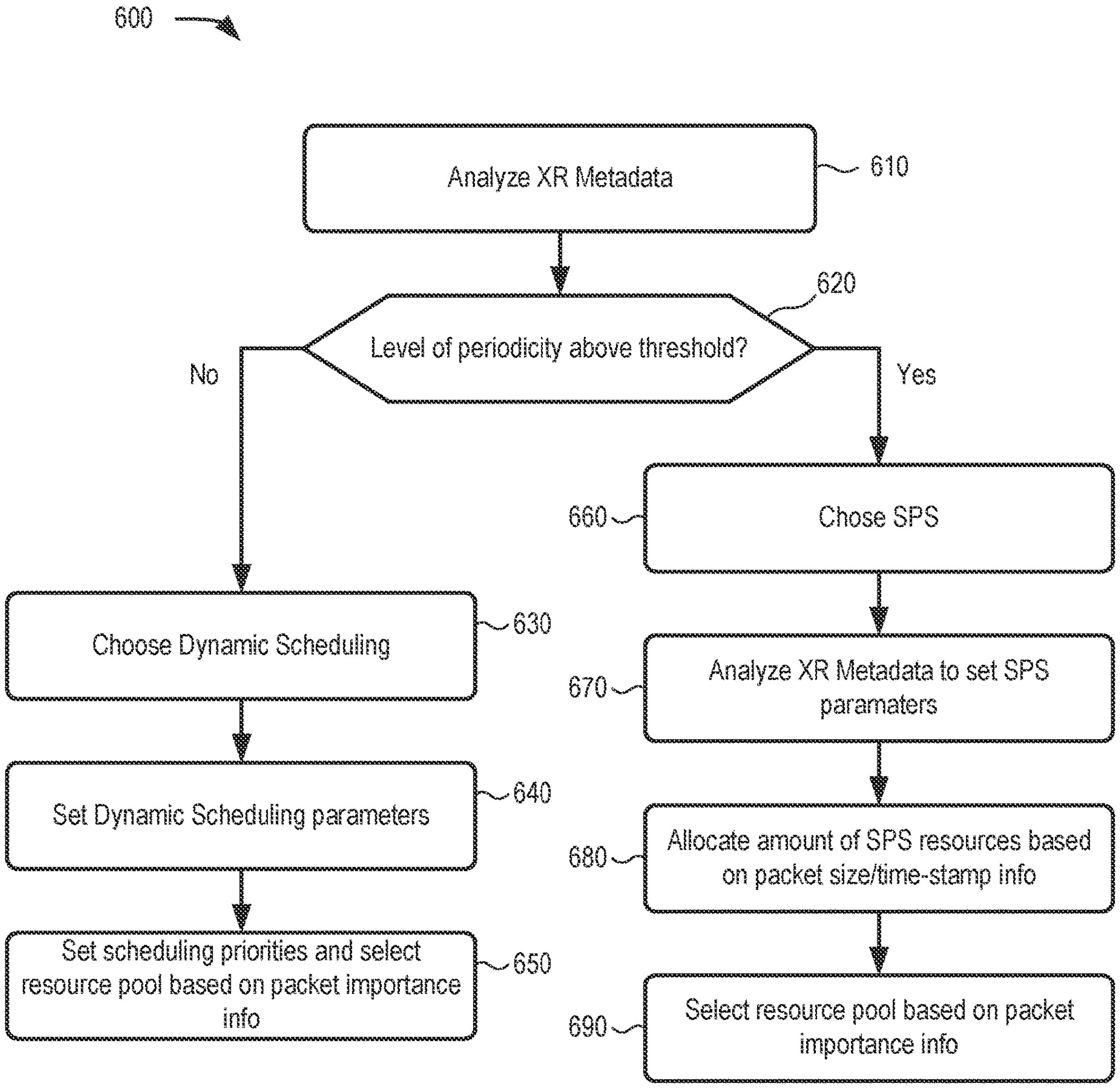

FIG. 6 is a flow diagram illustrating a process 600 for selecting and tuning a scheduling discipline for an XR session. According to an implementation, process 600 may be performed, for example, by XR-aware intelligence function 230. In other implementations, process 500 may be performed by XR-aware intelligence function 230 in conjunction with one or more other devices or functions in environment 200.

Process 600 may include analyzing XR metadata (block 610), and determining if the level of periodicity is above a threshold (block 620). For example, XR-aware intelligence function 230 may receive XR metadata 250/255 for an initial time interval, T, make an initial traffic characterization. For example, XR-aware intelligence function 230 may determine the level of periodicity (e.g., a likelihood of consistent traffic pattern) on a statistical basis. According to one implementation, XR-aware intelligence function 230 may analyze particular fields (e.g., from table 400) of XR metadata 250/255, such as data from time stamp field 410 and packet size field 430. In other implementations, XR-aware intelligence function 230 may also analyze data from packet type field 440. For example, the XR-aware intelligence function 230 may apply different periodicity thresholds for different packet types.

If the level of periodicity is not above a threshold (block 620—No), process 600 may include choosing dynamic scheduling (block 630), setting the dynamic scheduling parameters based on further analysis of the XR metadata (block 640), and setting scheduling priorities and selecting a resource pool based on packet importance information (block 650). For example, if XR metadata 250/255 does not provide an indication of periodicity (e.g., above a threshold level), XR-aware intelligence function 230 may select dynamic scheduling as an initial setting for the session. The dynamic scheduling parameters may be chosen based on further analysis of XR data. In particular, scheduling priorities for XR traffic may be set according to data in packet importance field 470. According to an implementation, a weighted packet forwarding (PF) scheme is used where the scheduling priorities are weighted per their importance. In addition, a resource pool (e.g., prioritized or shared best effort or preemptable) may be set according to packet importance information.

If the level of periodicity is above a threshold (block 620—Yes), process 600 may include choosing SPS (block 660), setting SPS parameters (bock 670), allocating an amount of SPS resources based on packet size and/or time-stamp information (block 680), and selecting a resource pool based on packet importance information (block 690). For example, if XR metadata 250/255 provides an indication of periodicity (e.g., at or above a threshold level), XR-aware intelligence function 230 may set parameters of SPS (e.g., an amount of resources allocated at different times, time period, etc.) based on further analysis of the XR metadata. In contrast with traditional SPS, which only allocates a fixed amount of radio resources periodically for a period of time, XR-Aware SPS may tailor the allocation of radio resources to the needs of an XR session, which can vary even within a time period. The packet size info and time stamps (e.g., fields 410/430) in the XR metadata may be used to allocate different amounts of resources at different times. In addition, the packet importance and/or packet type (e.g., fields 440/470) may be used to determine the resource pool (e.g., prioritized or shared best effort or preemptable) from which resources are allocated at different times. For example, XR data indicated as more important may be allocated resources from a prioritized resource pool, while XR data indicated as less important may be allocated resources from a shared best effort resource pool.

As set forth in this description and illustrated by the drawings, reference is made to “an exemplary embodiment,” “an embodiment,” “embodiments,” etc., which may include a particular feature, structure or characteristic in connection with an embodiment(s). However, the use of the phrase or term “an embodiment,” “embodiments,” etc., in various places in the specification does not necessarily refer to all embodiments described, nor does it necessarily refer to the same embodiment, nor are separate or alternative embodiments necessarily mutually exclusive of other embodiment(s). The same applies to the term “implementation,” “implementations,” etc.

The foregoing description of embodiments provides illustration, but is not intended to be exhaustive or to limit the embodiments to the precise form disclosed. Accordingly, modifications to the embodiments described herein may be possible. For example, various modifications and changes may be made thereto, and additional embodiments may be implemented, without departing from the broader scope of the invention as set forth in the claims that follow. The description and drawings are accordingly to be regarded as illustrative rather than restrictive.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items. The word "exemplary" is used herein to mean "serving as an example." Any embodiment or implementation described as "exemplary" is not necessarily to be construed as preferred or advantageous over other embodiments or implementations.

In addition, while series of communications have been described with regard to FIGS. 2A-2C and series of blocks have been described with regard to the processes illustrated in FIGS. 5 and 6, the order of the communications and blocks may be modified according to other embodiments. Further, non-dependent blocks may be performed in parallel. Additionally, other processes described in this description may be modified and/or non-dependent operations may be performed in parallel.

Embodiments described herein may be implemented in many different forms of software executed by hardware. For example, a process or a function may be implemented as "logic," a "component," or an "element." The logic, the component, or the element, may include, for example, hardware (e.g., processor 310, etc.), or a combination of hardware and software (e.g., software 320).

Embodiments have been described without reference to the specific software code because the software code can be designed to implement the embodiments based on the description herein and commercially available software design environments and/or languages. For example, various types of programming languages including, for example, a compiled language, an interpreted language, a declarative language, or a procedural language may be implemented.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

Additionally, embodiments described herein may be implemented as a non-transitory computer-readable storage medium that stores data and/or information, such as instructions, program code, a data structure, a program module, an application, a script, or other known or conventional form suitable for use in a computing environment. The program code, instructions, application, etc., is readable and executable by a processor (e.g., processor 310) of a device. A non-transitory storage medium includes one or more of the storage mediums described in relation to memory/storage 315. The non-transitory computer-readable storage medium may be implemented in a centralized, distributed, or logical division that may include a single physical memory device or multiple physical memory devices spread across one or multiple network devices.

To the extent the aforementioned embodiments collect, store or employ personal information of individuals, it should be understood that such information shall be collected, stored, and used in accordance with all applicable laws concerning protection of personal information. Additionally, the collection, storage and use of such information can be subject to consent of the individual to such activity, for example, through well known "opt-in" or "opt-out" processes as can be appropriate for the situation and type of information. Collection, storage and use of personal information can be in an appropriately secure manner reflective of the type of information, for example, through various encryption and anonymization techniques for particularly sensitive information.

No element, act, or instruction set forth in this description should be construed as critical or essential to the embodiments described herein unless explicitly indicated as such. All structural and functional equivalents to the elements of the various aspects set forth in this disclosure that are known or later come to be known are expressly incorporated herein by reference and are intended to be encompassed by the claims.

What is claimed is:

1. A method comprising:

receiving, by a network device in a radio access network (RAN), downlink (DL) metadata for downlink packets in an extended reality (XR) session;

receiving, by the network device, uplink (UL) metadata for uplink packets in the XR session;

configuring, by the network device, a packet importance ranking for each of the downlink and the uplink packets based on the DL metadata and the UL metadata;

selecting, by the network device, a scheduling discipline for the XR session based on a determined likelihood of a consistent traffic pattern from the DL metadata and the UL metadata;

selecting, by the network device, between a prioritized resource pool and a shared best effort resource pool for implementing the selected scheduling discipline based on the packet importance ranking of packets in the DL metadata or the UL metadata; and implementing, by the network device, the selected scheduling discipline for the XR session using the selected prioritized resource pool or the shared best effort resource pool.

2. The method of claim 1, wherein selecting the scheduling discipline includes:

selecting between one of dynamic scheduling and semi-persistent scheduling (SPS).

3. The method of claim 1, wherein selecting the scheduling discipline includes:

analyzing the DL metadata and the UL metadata;

detecting if one or more data types of the DL metadata or the UL metadata exceeds a periodicity threshold; and selecting a semi-persistent scheduling (SPS) discipline when the one or more data types of the DL metadata or the UL metadata exceeds the periodicity threshold.

4. The method of claim 1, wherein the network device includes a gNodeB with an intelligence function.

5. The method of claim 1, wherein receiving the DL metadata includes:

receiving the DL metadata from an application server device in real-time or near-real-time.

6. The method of claim 1, wherein receiving the UL metadata includes:

receiving the UL metadata from a UE device via an application server device in real-time or near-real time.

7. The method of claim 1, wherein at least one of the DL metadata or the UL metadata includes one or more of:
a times stamp,
a packet size, and
a packet type.

8. The method of claim 1, wherein the packet importance ranking is based on the content and the transcoding scheme of each packet.

9. The method of claim 1, wherein receiving the DL metadata or wherein receiving the UL metadata includes:
receiving the DL metadata or the UL metadata via an Application Programming Interface (API).

10. The method of claim 1, wherein receiving the UL metadata further includes:
receiving the UL metadata via an application server in a Multi-access Edge Computing (MEC) network.

11. A radio access network (RAN) device comprising:
one or more processors configured to:
receive downlink (DL) metadata for downlink packets in an extended reality (XR) session;
receive uplink (UL) metadata for uplink packets in the XR session;
configure a packet importance ranking for each of the downlinks and the uplink packets based on the DL metadata and the UL metadata;
select a scheduling discipline for the XR session based on a determined likelihood of a consistent traffic pattern from the DL metadata and the UL metadata;
select between a prioritized resource pool and a shared best effort resource pool for implementing the selected scheduling discipline based on the packet importance ranking of packets in the DL metadata or the UL metadata; and
implement the selected scheduling discipline for the XR session using the selected prioritized resource pool or the shared best effort resource pool.

12. The RAN device of claim 11, wherein, when selecting the scheduling discipline, the one or more processors are further configured to:
select between one of dynamic scheduling and semi-persistent scheduling (SPS).

13. The RAN device of claim 11, wherein, when selecting the scheduling discipline, the one or more processors are further configured to:
analyze the DL metadata and the UL metadata;
detect if one or more data types of the DL metadata or the UL metadata exceeds a periodicity threshold; and
select a semi-persistent scheduling (SPS) discipline when the one or more data types of the DL metadata or the UL metadata exceeds the periodicity threshold.

14. The RAN device of claim 11, wherein the XR session is between a UE device and a Multi-access Edge Compute (MEC) device in a MEC network.

15. The RAN device of claim 11, wherein the RAN device includes a gNodeB with an intelligence function.

16. The RAN device of claim 11, wherein, when receiving the UL metadata, the one or more processors are further configured to:
receive the UL metadata via an application server in a Multi-access Edge Computing (MEC) network.

17. The RAN device of claim 11, wherein the RAN device includes a centralized unit (CU) device.

18. A non-transitory, computer-readable storage medium storing instructions, executable by a processor of a network device, for:
receiving, by a network device in a radio access network (RAN), downlink (DL) metadata for downlink packets in an extended reality (XR) session;
receiving, by the network device, uplink (UL) metadata for uplink packets in the XR session;
configuring, by the network device, a packet importance ranking for each of the downlinks and the uplink packets based on the DL metadata and the UL metadata;
selecting, by the network device, a scheduling discipline for the XR session based on a determined likelihood of a consistent traffic pattern from the DL metadata and the UL metadata;
selecting, by the network device, between a prioritized resource pool and a shared best effort resource pool for implementing the selected scheduling discipline based on the packet importance ranking of packets in the DL metadata or the UL metadata; and
implementing, by the network device, the selected scheduling discipline for the XR session using the selected prioritized resource pool or the shared best effort resource pool.

19. The non-transitory, computer-readable storage medium of claim 18, wherein the instructions are further for:
analyzing the DL metadata and the UL metadata;
detecting if one or more data types of the DL metadata or the UL metadata exceeds a periodicity threshold; and
selecting a semi-persistent scheduling (SPS) discipline when the one or more data types of the DL metadata or the UL metadata exceeds the periodicity threshold.

20. The non-transitory, computer-readable storage medium of claim 18, wherein the packet importance ranking is based on the content and the transcoding scheme of each packet.

* * * * *